US011847244B1

(12) United States Patent
Madan et al.

(10) Patent No.: US 11,847,244 B1
(45) Date of Patent: Dec. 19, 2023

(54) PRIVATE INFORMATION DETECTOR FOR DATA LOSS PREVENTION

(71) Applicant: Shoreline Labs, Inc., San Francisco, CA (US)

(72) Inventors: Isaac Abhay Madan, San Francisco, CA (US); Rohan Shrikant Sathe, San Francisco, CA (US); Trung Hoai Nguyen, Alameda, CA (US); Yiang Zheng, San Francisco, CA (US)

(73) Assignee: Shoreline Labs, Inc., San Francisco, CA (US)

(*) Notice: Subject to any disclaimer, the term of this patent is extended or adjusted under 35 U.S.C. 154(b) by 1105 days.

(21) Appl. No.: 16/545,952

(22) Filed: Aug. 20, 2019

(51) Int. Cl.
*G06F 21/62* (2013.01)
*G06N 20/00* (2019.01)
*G06F 9/54* (2006.01)

(52) U.S. Cl.
CPC ............ *G06F 21/6245* (2013.01); *G06F 9/54* (2013.01); *G06N 20/00* (2019.01)

(58) Field of Classification Search
CPC ... G06N 20/00; G06F 4/54; G06F 2221/2141; G06F 2221/0751; G06F 21/6245; G06F 21/62; G06F 21/44
See application file for complete search history.

(56) References Cited

U.S. PATENT DOCUMENTS

| | | | |
|---|---|---|---|
| 6,128,410 A * | 10/2000 | Park | G06F 18/24147 382/218 |
| 8,667,121 B2 | 3/2014 | Ahuja et al. | |
| 10,379,995 B1 * | 8/2019 | Walters | G06N 20/20 |
| 10,897,400 B1 * | 1/2021 | Hermoni | H04L 41/5051 |
| 10,983,841 B2 * | 4/2021 | Walters | G06N 3/0454 |
| 2009/0254572 A1 * | 10/2009 | Redlich | G06Q 10/06 |
| 2013/0103718 A1 * | 4/2013 | Aithal | G06F 13/00 707/E17.014 |
| 2020/0012583 A1 * | 1/2020 | Walters | G06F 9/547 |

(Continued)

OTHER PUBLICATIONS

"zricethezav/gitleaks" (https://github.com/zricethezav/gitleaks; Wayback Machine copy archived "20190519062435") (Year: 2019).*

(Continued)

*Primary Examiner* — Jeffrey C Pwu
*Assistant Examiner* — Paul J Skwierawski
(74) *Attorney, Agent, or Firm* — NICHOLSON DE VOS WEBSTER & ELLIOTT LLP

(57) ABSTRACT

A private information detector for data loss prevention is described. In one embodiment, a method includes training a first, machine learning model on a set of known application programming interface keys to detect application programming interface keys, training a second, machine learning model on code including known application programming interface keys to detect adjacent characters to application programming interface keys, scanning a repository with the first, machine learning model to select a proper subset of the repository that includes possible application programming interface keys and adjacent characters, scanning the proper subset of the repository with the second, machine learning model to detect and remove potential false positives of the possible application programming interface keys based on adjacent characters of the possible application programming interface keys to generate a list of probable application programming interface keys, and sending an indication for the list of probable application programming interface keys.

20 Claims, 12 Drawing Sheets

(56) References Cited

U.S. PATENT DOCUMENTS

| | | | | |
|---|---|---|---|---|
| 2020/0012671 | A1* | 1/2020 | Walters | G06F 17/16 |
| 2020/0012811 | A1* | 1/2020 | Walters | G06F 16/93 |
| 2020/0012891 | A1* | 1/2020 | Watson | G06F 16/248 |
| 2020/0012935 | A1* | 1/2020 | Goodsitt | G06N 3/0454 |
| 2020/0014722 | A1* | 1/2020 | Walters | G06N 20/20 |
| 2020/0412768 | A1* | 12/2020 | Hegde | H04L 9/3242 |
| 2021/0019412 | A1* | 1/2021 | Hewlett, II | G06F 21/565 |
| 2021/0021611 | A1* | 1/2021 | Hewlett, II | H04L 63/1425 |
| 2023/0208875 | A1* | 6/2023 | Do | H04L 63/1425 726/22 |

OTHER PUBLICATIONS

Github, "Get Started with Github Enterprises—The World's Leading Software Development Platform," 2019, retrieved from the Internet: https://github.com on Aug. 20, 2019, 10 pages.

Github, "GitHub—awslabs/git-secrets: Prevents You from Committing Secrets and Credentials into Git Repositories," 2019, retrieved from the Internet: https://github.com/awslabs/git-secrets on Aug. 20, 2019, 9 pages.

Github, "GitHub—dxa4481/truffleHog: Searches Through Git Repositories for High Entropy Strings and Secrets, Digging Deep in to Commit History," 2019, retrieved from the Internet: https://github.com/dxa4481/truffleHog on Aug. 20, 2019, 4 pages.

Github, "GitHub—Zricethezav/gitleaks: Audit Git Repos for Secrets," 2019, retrieved from the Internet: https://github.com/zricethezav/gitleaks on Aug. 20, 2019, 5 pages.

Gitlab, "A Full Devops Tool Chain—The First Single Application for the Entire Devops Lifecycle," 2019, retrieved from the Internet: https://about.gitlab.com on Aug. 20, 2019, 10 pages.

Github, "GitHub—michenriksen/gitrob: Reconnaissance Tool for GitHub Organizations," 2019, retrieved from the Internet: https://github.com/michenriksen/gitrob on Aug. 20, 2019, 3 pages.

* cited by examiner

FIG. 2

| DLP DETECTOR | SEARCH FOR A REPOSITORY URL | | | | SIGN OUT |
|---|---|---|---|---|---|
| API CONSOLE | DASHBOARD | | | | |
| ⌂ DASHBOARD | | | SCAN STATUS: 1 COMPLETED | ▷ START A SCAN | |
| 🗎 DOCS | SCANS | | | | |
| ⚙ SETTINGS | DATE | URL | STATUS | DURATION | #RESULTS ↓RESULTS ⟳RESET |
| | 5/05/2019 AT 12:48PM  HTTPS://EXAMPLEURL  COMPLETED ⓘ  0.95 SECONDS  2  ⓘ INFO ⦿ RESULTS | | | | |
| | 1 MINUTE AGO | | | | VIEW |
| | PREVIOUS 1 NEXT | | PAGE 1 OF 1 (10 TABLES PER PAGE): | | VIEW ALL |

| DLP DETECTOR | SEARCH FOR A REPOSITORY URL | | | | SIGN OUT |
|---|---|---|---|---|---|
| API CONSOLE | SCAN ID 4DD362AB-F341-41FD-839A-228D5614798F | | | SCAN STATUS: 1 COMPLETED | ▷ START A SCAN |
| ⌂ DASHBOARD | PERMALINK: HTTPS://EXAMPLEURL⦿ | | | | |
| 🗎 DOCS | STATUS: COMPLETED  FULL COMMIT HISTORY WAS SCANNED | | | | ↓RESULTS ⟳RESET |
| ⚙ SETTINGS | DURATION: 0.95 SECONDS | | | | |
| | SCAN INITIATED: 05/05/2019 AT 12:48PM (1 MINUTE AGO) | | | | |
| | # | AUTHOR EMAIL | FILEPATH | PRECEDING CHARS | PROBABLE PRIVATE INFORMATION  PERMALINK |
| | 1 | USER1@COMPANYURL | SAMPLE.RB | A4300836696C47B4F2D7C'  +AUTH_TOKEN = ' | db············  ⓘ DETAILS ⦿ REPOSITORY |
| | 2 | USER9@COMPANYURL | SAMPLE.PY | ,9 @@  +IMPORT SERVICE  +SERVICE.API_KEY = " | sk············  ⓘ DETAILS ⦿ REPOSITORY |

300 ⟶
302 ⟶
304 ⟶
306 ⟶
308 ⟶

600

```
┌─────────────────────────────────────────────────────────────────────┐
│ TRAINING A FIRST, MACHINE LEARNING MODEL ON A SET OF KNOWN APPLICATION │
│ PROGRAMMING INTERFACE KEYS TO DETECT APPLICATION PROGRAMMING INTERFACE │
│                              KEYS 602                                │
└─────────────────────────────────────────────────────────────────────┘
                                   ↓
┌─────────────────────────────────────────────────────────────────────┐
│ TRAINING A SECOND, MACHINE LEARNING MODEL ON CODE INCLUDING KNOWN     │
│ APPLICATION PROGRAMMING INTERFACE KEYS TO DETECT ADJACENT CHARACTERS  │
│            TO APPLICATION PROGRAMMING INTERFACE KEYS 604             │
└─────────────────────────────────────────────────────────────────────┘
                                   ↓
┌─────────────────────────────────────────────────────────────────────┐
│ SCANNING A REPOSITORY WITH THE FIRST, MACHINE LEARNING MODEL TO SELECT A │
│ PROPER SUBSET OF THE REPOSITORY THAT INCLUDES POSSIBLE APPLICATION      │
│ PROGRAMMING INTERFACE KEYS AND ADJACENT CHARACTERS 606                  │
└─────────────────────────────────────────────────────────────────────┘
                                   ↓
┌─────────────────────────────────────────────────────────────────────┐
│ SCANNING THE PROPER SUBSET OF THE REPOSITORY WITH THE SECOND, MACHINE │
│ LEARNING MODEL TO DETECT AND REMOVE POTENTIAL FALSE POSITIVES OF THE  │
│ POSSIBLE APPLICATION PROGRAMMING INTERFACE KEYS BASED ON ADJACENT     │
│ CHARACTERS OF THE POSSIBLE APPLICATION PROGRAMMING INTERFACE KEYS TO  │
│ GENERATE A LIST OF PROBABLE APPLICATION PROGRAMMING INTERFACE KEYS 608│
└─────────────────────────────────────────────────────────────────────┘
                                   ↓
┌─────────────────────────────────────────────────────────────────────┐
│ SENDING AN INDICATION FOR THE LIST OF PROBABLE APPLICATION PROGRAMMING│
│                          INTERFACE KEYS 610                          │
└─────────────────────────────────────────────────────────────────────┘
```

FIG. 6

PRIVATE INFORMATION DETECTOR FOR DATA LOSS PREVENTION

BACKGROUND

Computer networks have become indispensable tools for modern business. Enterprises can use networks for communications and, further, can store data in various forms and at various locations. Critical information frequently propagates over a network of a business enterprise. Modern enterprises may employ numerous tools to control the dissemination of such information and many of these tools attempt to keep outsiders, intruders, and unauthorized personnel from accessing valuable or sensitive information.

BRIEF DESCRIPTION OF DRAWINGS

Various embodiments in accordance with the present disclosure will be described with reference to the drawings, in which:

FIG. 2 is a diagram illustrating a dashboard of a user interface for a data loss prevention service according to embodiments of the disclosure.

FIG. 3 is a diagram illustrating a results summary of a scan for a data loss prevention service according to embodiments of the disclosure.

FIG. 6 illustrates a flow diagram according to embodiments of the disclosure.

DETAILED DESCRIPTION

Figure 1:
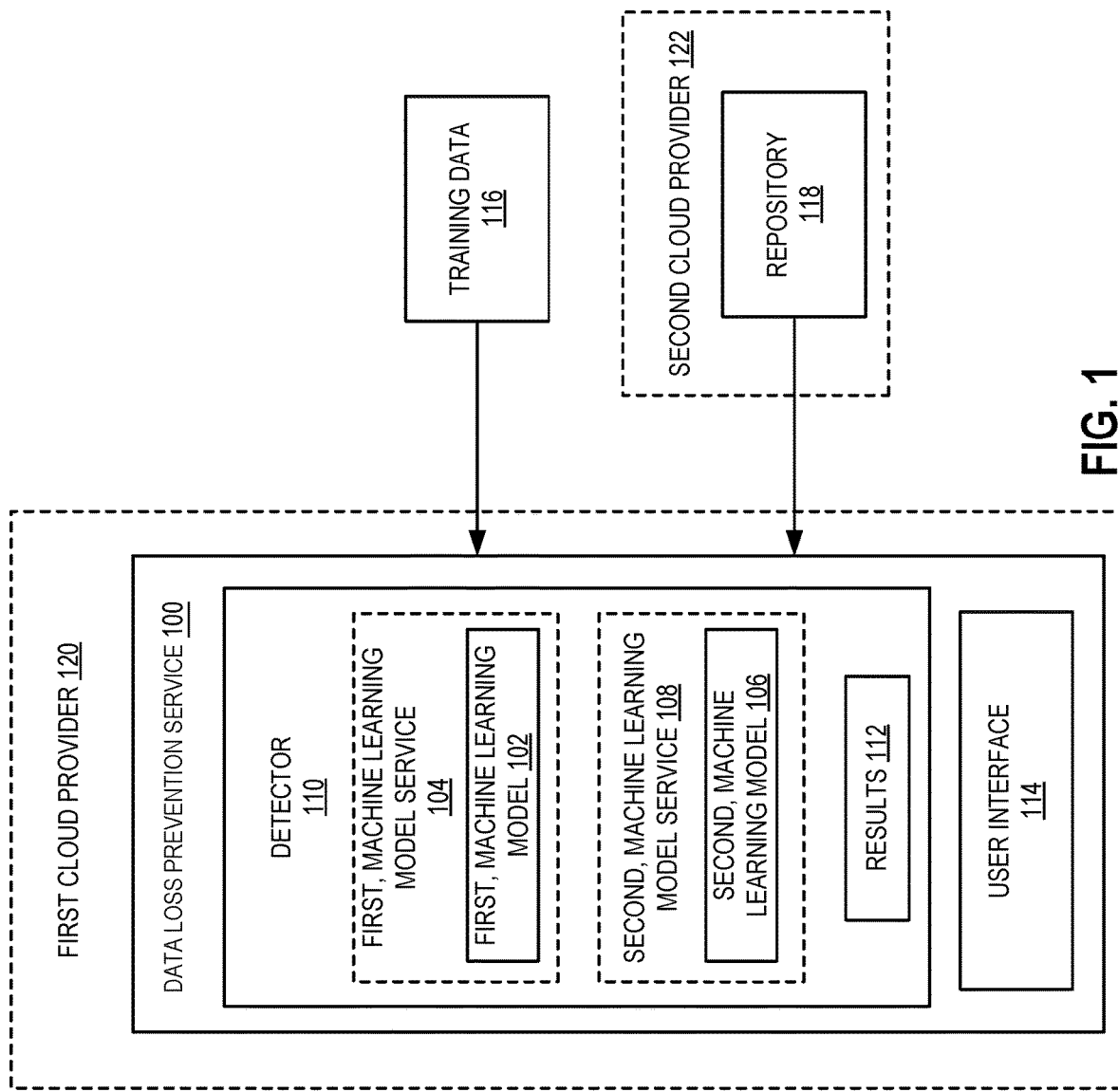
FIG. 1 is a diagram illustrating an environment including a data loss prevention service having a detector in a first cloud provider to detect private information in a repository in a second cloud provider according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Although modern enterprises may employ numerous tools to control the dissemination of private information, such information may unintentionally be disseminated. For example, a version control system may be utilized for code (e.g., an application) to track changes in the code. In certain embodiments, a repository (which may be referred to as a "repo") is a location where all the files (e.g., source code) for a particular project are stored. In one embodiment, each particular project has its own repository which can be accessed over a network with a unique identifier (e.g., its uniform resource locator (URL)).

In certain embodiments, repository hosting providers (such as GitHub or GitLab) socialize software development, making it easier to collaborate on projects and ship code quickly. However, use of such repositories has led to an increase in the accidental publication of private (e.g., sensitive) information. Non-limiting examples of private information are authentication keys, encryption keys, secrets (e.g., passwords), and credentials. Another non-limiting example of private information is application programming interface (API) keys (e.g., a private key used as a secret token for authentication to authenticate the source of the API request). The accidental publication of private information occurs daily as new commits are pushed up as part of a software development lifecycle. Abuse of this leaked information (e.g., credentials) can cause salient security and compliance risks, such as catastrophic loss of sensitive customer data, harming an organization both financially and reputationally, while putting consumers at risk.

Certain embodiments herein provide for a data loss prevention service to identify an occurrence or potential occurrence of private information. Certain embodiments herein identify an occurrence or potential occurrence of private information by training a first, machine learning model on a set of known private information to detect private information, running the first, machine learning model on code to retrieve a proper subset of the code as possible private information, training a second, machine learning model on the code by marking the proper subset of the code to indicate false positives of the possible private information, scanning a repository with the second, machine learning model to detect a potential occurrence of private information, and sending an indication for the potential occurrence of private information.

Certain embodiments herein identify an occurrence or potential occurrence of an application programming interface key by training a first, machine learning model on a set of known application programming interface keys to detect application programming interface keys, running the first, machine learning model on code to retrieve a proper subset of the code as possible application programming interface keys, training a second, machine learning model on the code by marking the proper subset of the code to indicate false positives of the possible application programming interface keys, scanning a repository with the second, machine learning model to detect a potential occurrence of an application programming interface key, and sending an indication for the potential occurrence of the application programming interface key.

The embodiments herein are improvements to technology and computer functionality. Certain embodiments herein improve technology and computer functionality by utilizing machine learning as discussed herein to dramatically improve the chances of accurately detecting private information in code.

For example, in one embodiment, private information is detected using one or a mix of entropy and regular expressions (regex). In certain embodiments, a detector uses the average rate at which information is produced by a stochastic source of data (e.g., the Shannon entropy or information entropy), e.g., and does not check variable names. In one embodiment, a high entropy score is the result of high variability of information, e.g., a string with only one repetitive character will have low entropy, since there is only one state, and can be converted to 1 bit of information. On the other hand, a string with a diverse set of characters that appears highly random, such as API keys, will utilize more bits to transmit, having much higher entropy.

In certain embodiments, a detector uses a regular expression (regex) to search for possible private information. In one embodiment, a regex is a sequence of characters that defines a search pattern, for example, to perform lexical searching to match a variable name or API key pattern.

The embodiments herein provide a novel system and method of leveraging machine learning to overcome the limitations of merely relying on entropy and/or regular expressions. For example, certain embodiments herein provide for contextual awareness, e.g., to avoid noisy search results. For example, the embodiments herein can distinguish between long variable names and credentials, e.g., "TestScrapeLoopRunReportsTargetDownOnInvalidUTF8" which is a high-entropy string and would likely get flagged as a false positive when detected using entropy.

Regular expressions may search for generic patterns, and thus only work well on finding private information (e.g., API keys) with explicitly defined & repeatable patterns, e.g., starting with some fixed characters, or very lengthy keys. Requiring these unique characteristics dramatically reduces the pool of potential tokens that can be flagged accurately when detected using regular expressions. In one embodiment, a regular expression search only searches for an alphanumeric token between 32 and 45 characters with a variable name containing "apikey" or "secret".

Certain embodiments herein provide a novel detector system and method of leveraging machine learning to produce fewer false positives than a detector using simple keyword searching which yields many false positives. For example, where each false positive requires a user to manually go through all detected files (e.g., tokens) to check if they contain valid private (e.g., sensitive) information or not, which can be very time-consuming.

Certain embodiments herein limit a length of the private information (e.g., API keys) being searched for, e.g., to avoid a high number of false positives and being comprehensive enough to capture keys with more diverse character sets.

Certain embodiments herein provide a novel detector system and method of leveraging machine learning to discover API keys even where the user provided variable name does not match the variable name assumed by the searched-for regexes. For example, a detector may mandate that secret API key must have the word "key" in the variable name, so a change of the variable name to "repository_secret" instead of "repository_key" or "secret_token" instead of "secret_key" would not trigger the regex, leading to a false negative. Certain regex search patterns are indistinguishable from a (e.g., 128 bit) universally unique identifier (UUID). Regex search results can also be quite noisy from matching numerous hashes (e.g., hashes under a secure hash algorithm (SHA)) as well. As another example, an API key regex may be /[a|A][p|P][i|I][_]?[k|K][e|E][y|Y].*['\"][0-9a-zA-Z]['\"]/. The following sample code:
api_key='123456789012345678901234567890012'
api_token='123456789012345678901234567890012'

In this code example, when applying the above regex, the API key in the first line will be captured, while the second will not. This demonstrates that regex searching is limited to the lexical format of the code. Because variable naming conventions differ from developer to developer, this can easily lead to situations where designed regexes do not match the variable names that a regex is searching for. Abiding by naming conventions to be compliant with a regex's rules is not practical for millions of unique programmers. The embodiments herein do not dictate and constrain how developers utilize naming conventions and thus are improvements to the functioning of data loss prevention in computing.

In certain embodiments, a Shannon entropy search, due to the sheer quantity of its output, yields a high degree of false positives making it untenable to use at scale. In one embodiment, a Shannon entropy search calculates the Shannon entropy for each API key (e.g., token), e.g., it does not check or search for variable names.

Certain embodiments herein provide a novel detector system and method of leveraging machine learning to produce fewer false positives than a detector that captures all strings longer than a certain number of (e.g., 20) characters, within the character set [a-fA-F0-9], and requires users to manually go through the results to check if they are valid (e.g., they are actually API keys and not other data).

Certain embodiments herein incorporate more comprehensive features and the resultant false negative rate and false positive rate are both quite low, thus enhancing the user experience when verifying results. Certain embodiments herein provide a novel detector system and method of leveraging machine learning to scan both public and private repositories, e.g., without storing or tracking sensitive findings.

FIG. 1 is a diagram illustrating an environment including a data loss prevention service 100 having a detector 110 in a first cloud provider 120 to detect private information in a repository 118 in a second cloud provider 122 according to embodiments of the disclosure. Detector 110 includes a first, machine learning model 102 and a second, machine learning model 106. In certain embodiments, a first, machine learning model is trained on a set of known private information (e.g., application programming interface keys) to detect private information (e.g., application programming interface keys).

In certain embodiments, the first, machine learning model 102 is trained on a set of known (e.g., private) application programming interface keys (e.g., training data 116) to create a model to detect (e.g., not known) application programming interface keys. For example, a DLP service provider may have a list of known (but intended to be private) API keys. In certain embodiments, the second, machine learning model is trained on data (e.g., training data 116) that includes known (e.g., public and/or private) application programming interface keys to create a model to detect adjacent characters to the known (e.g., public and/or private) application programming interface keys. In one embodiment, the set of known API keys used to train the first, machine learning model 102 is not the same as the API keys in the code used to train the second, machine learning model 106. In certain embodiments, the adjacent characters are a certain number (e.g., up to about 40) of characters that precede the API keys in the code used to train the second, machine learning model 106.

In certain embodiments, the first, machine learning model 102 is run on code (e.g., training data 116) to select (e.g., mark or retrieve) a proper subset of the code as possible private information (e.g., possible application programming interface keys), and trained by marking false positives (e.g., and true positives) as false (e.g., or true, accordingly) for the possible API keys. In certain embodiments, the second, machine learning model 106 is run on code (e.g., training data 116) to select (e.g., mark or retrieve) a proper subset of the code as a context of (e.g., a context immediately preceding) possible private information (e.g., possible application programming interface keys), and trained by marking false positives (e.g., and true positives) as false (e.g., or true, accordingly) for those possible contexts.

In certain embodiments, the trained first machine learning model 102 and trained, second machine learning model 106 are used by detector 110 to scan repository 118 to detect (e.g., probable) occurrence(s) of private information (e.g., application programming interface key(s)) to generate results 112. In one embodiment, the detector 110 scans repository 118 with the first, machine learning model 102 to select (e.g., mark or retrieve) a proper subset of the repository 118 that includes possible application programming interface keys and adjacent characters, and (e.g., after the first scan is begun or is complete) scans the proper subset of the repository 118 with the second, machine learning model 106 to detect (e.g., and remove) potential false positives of the possible application programming interface keys based on adjacent characters of each of the possible application programming interface keys to generate a list of probable application programming interface key(s) (e.g., as results 112). In one embodiment, detector 110 sends an indication (e.g., of results 1012) for the list of probable application programming interface key(s).

Depicted data loss prevention service 100 includes a user interface 114 to allow a user to configure the data loss prevention service (e.g., the detector 110 thereof). In one embodiment, user interface is a dashboard that allows viewing of results visually, e.g., rather than programatically.

In certain embodiments, data loss prevention service 100 includes a first, machine learning model service 104 to generate and/or train first, machine learning model 102 and/or includes a second, machine learning model service 108 to generate and/or train second, machine learning model 106.

Optionally, detector 110 is stored and executed on first cloud provider 120. Optionally, repository 118 is stored on second cloud provider 122. In one embodiment, a cloud provider is a network that provides a storage service and a hardware virtualization service to user (e.g., customer).

Detector 110 scans repositories for private information (e.g., sensitive credentials and secrets, such as, but not limited to, API keys). In one embodiment, detector 110 utilizes models 102 and 106 built via machine learning to provide more accurate, less noisy results than other approaches like regular expression searching or high-entropy string detection. In certain embodiments, there is no need to specify what exact types of private information (e.g., keys or credentials) that are being searched for as the detector 110 discovers a very broad set of private information. A further discussion of training of machine learning models is below, e.g., in reference to FIGS. 4A-5D.

As one example, trained detector 110 is set (e.g., via user interface 114) to scan repository 118 for confidential information. In one embodiment, repository 118 is public. In another embodiment, repository 118 is private and access to it is provided, e.g., via a user provided key or via a repository account that is logged into data loss prevention service 100 with. In certain embodiments, the full commit history of repository 118 will be scanned. In certain embodiments, only the files in the current working directory of repository 118 will be scanned.

In one embodiment, detector 110 runs scans asynchronously such that the endpoint will respond immediately upon starting the scan with a scan identification (ID) value. The scan ID may be used to retrieve the results (e.g., indication of probable private information) when ready via an API call, e.g., "Get Scan Results". User interface 114 may provide a notification (e.g., via email or at a webhook endpoint as discussed below) when the scan is complete, and results are ready for retrieval.

Start a New Scan Example

In one embodiment to start a new scan, the input into detector 110 is the URL (e.g., and corresponding key) to repository 118, and the output is the (i) status of the scan (e.g., one of: running, error, scan limit exceeded, or usage error), (ii) message regarding status of the scan, and/or (iii) the scan ID that identifies the scan.

Get List of Scans Example

In one embodiment, the command to Get List of Scans from detector 110 returns a list of the most recent scans ordered by creation date. In certain embodiments, the scan results are not included. In one embodiment, the scan results are viable in the repository 118 itself and are viewed through a link provided by user interface 114. In one embodiment to get a list of scans, the optional input into detector 110 is a limit of the number of objects returned, and the command to Get List of Scans for detector 110 causes an output of: (i) the status of that particular scan for each of a plurality of scans (e.g., one of completed, running, or failed), (ii) an indication of the limit (e.g., if a limit was input), and/or (iii) an array of scan objects with each object including an ID value to uniquely identify the scan, the URL of the repository that was scanned, the duration of the scan (e.g., in seconds), and/or the day and time when the scan was initiated (or completed).

Get Scan Results Example

In one embodiment, the command to Get List of Scans from detector 110 returns the results for a specific scan. In one embodiment to get a list of scans, the input into detector 110 is the identification value for the specific scan, and the output is (i) scan ID value, (ii) URL of the repository that was scanned, (iii) duration of the scan (e.g. in seconds), (iv) value that indicate the day/time the scan was initiated, (v) the number of files scanned in the repository, (vi) status code (for example, HyperText Transfer Protocol (HTTP) response code, e.g., where codes in the 2xx indicate success, codes in the 4xx range indicate a failure given the information provided, and codes in the 5xx range indicate an error with data loss prevention service 100 servers), (vii) value indicate whether the entire repository (e.g., full commit history (FCH)) was scanned (e.g., one of a Boolean one or zero) or if only the current working directory (CWD) of the repository was scanned (e.g., the other of the Boolean one or zero), (viii) the number of scan results, and/or an array of results objects. In one embodiment, the array of result objects includes one result object for each item of private information (for example, for each sensitive token string, e.g., API key, credential, etc.). Each result object may have one or more of the following attributes: result ID value that uniquely identifies a result, path of the repository in which the result was found, path of the file in which the result was found, branch name in which the result was found, commit hash in the repository, email address for the author of the commit, the preceding characters before the private information, the (e.g., redacted) private information (e.g., sensitive token) that was discovered, the length (e.g., in number of characters) of the private information (e.g., sensitive token) found, a link (e.g., permalink) to the exact line of the finding of private information in the repository, and/or date/time when the result was found.

Webhook Endpoint Example

Certain embodiments herein allow a webhook URL to be registered with the user interface 114 to notify a user(s) when a scan is completed and results 112 are ready to retrieve. In one embodiment, this notification (e.g., event) object contains relevant information about the scan. In certain embodiments, the data loss prevention service 100 sends the notification object via an HTTP post request to the webhook URL that has been defined in the user interface 114. Each notification (e.g., event) object may include one or more of the following: (i) HTTP response code indicating the status of the scan (e.g., when the code is 2xx it indicates success, and a the scan ID value is used to get the scan's results via the Get Scan Results example discussed above, (ii) scan ID value that uniquely identifies the scan, (iii) duration of the scan (e.g., in seconds), and/or (iv) the URL of the repository that was scanned. In one embodiment, to set up an endpoint, a user defines a route on their server for receiving events and configured the corresponding webhook URL in the user interface 114 so that data loss prevention service 100 has an indication for where to post an event. In one embodiment, a user interface includes a dashboard to control a data loss prevention service (e.g., of a data loss prevention system).

FIG. 2 is a diagram illustrating a dashboard 200 of a user interface for a data loss prevention service according to embodiments of the disclosure. Dashboard 200 includes an example scan 202. Depicted scan 202 is a completed scan with fields that show the date (e.g., the date the scan was initiated), the URL of the repository that was scanned (where the URL is opened for a user when the URL text is clicked on by the user), the status (e.g., status code discussed herein), the duration to complete the scan, the number of results (e.g., the number of private information items that was found during the search), an information (info) button 204 (e.g., trigger within a graphical user interface) to view additional information (e.g., as discussed above in reference to the Get Scan Results example), and a results button 206 (e.g., a trigger to show the results summary 300 in FIG. 3 when selected).

FIG. 3 is a diagram illustrating a results summary 300 of a scan for a data loss prevention service according to embodiments of the disclosure. Depicted results summary 300 includes fields that show a link (e.g., permalink) to the repository that was scanned, a status (e.g., shown as completed), the duration of the scan, the date the scan was initiated, and an entry for each possible private information. For example, with entry 302 and entry 304 including a number field to indicate a respective number for the entry (e.g., 1 to N, where N is a positive integer), the author's email address (for example, the email address for the author that included the possible private information, e.g., the author of the commit that saved the private information into the repository), the file path, the preceding characters before the possible private information, a redacted version of the private information (e.g., shown with only the first two characters and the rest blacked out), and a permalink field including a details button 306 (e.g., trigger within a graphical user interface) to view additional information (e.g., the attributes as discussed above in reference to the Get Scan Results example), and a repository button 308 to open a repository viewer to the exact line of the finding of private information in the repository.

A further discussion of training of machine learning models follows. In certain embodiments, a first model includes embedding of data, a long short-term memory layer, a first dense layer (e.g., first, fully connected layer), and a second dense layer (e.g., second, fully connected layer). In certain embodiments, a second model includes embedding of data, a first, long short-term memory layer, a second, long short-term memory layer, and a dense layer (e.g., fully connected layer).

Figure 4A:
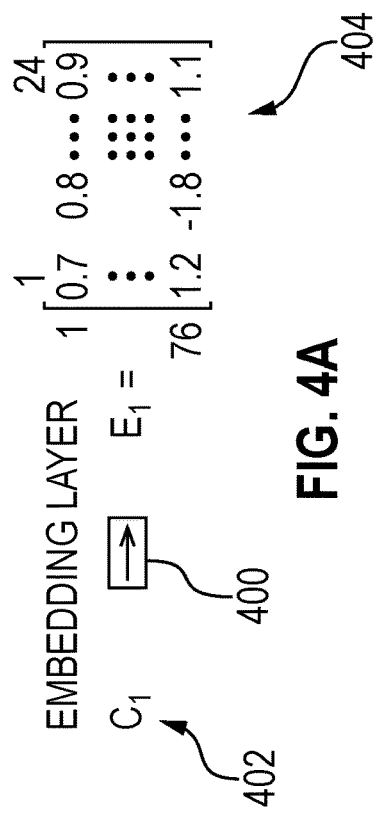
FIGS. 4A-4C illustrate the training of a first, machine learning model on a known application programming interface key to detect application programming interface key(s) according to embodiments of the disclosure.
Figure 4B:
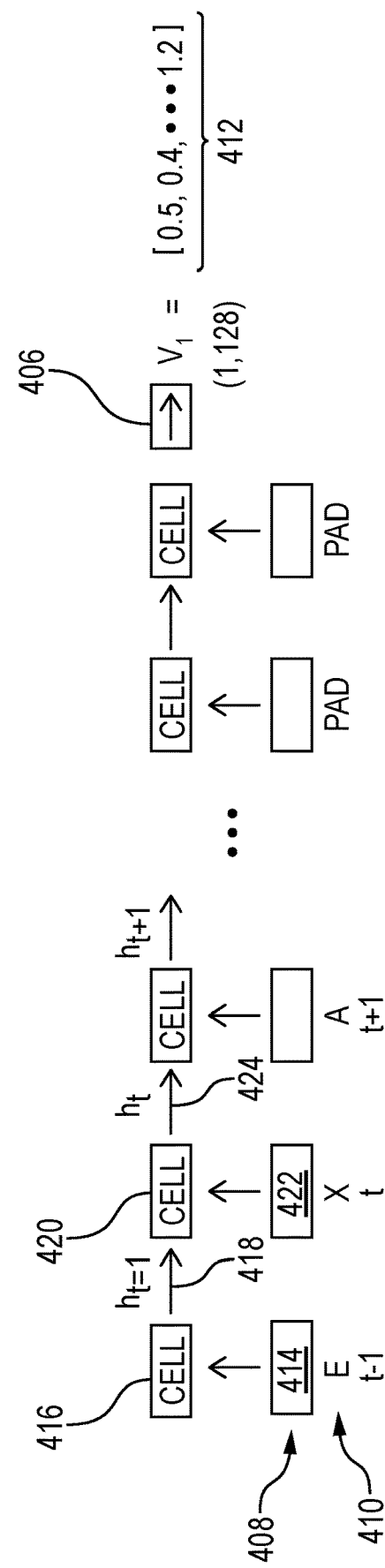
Figure 4C:
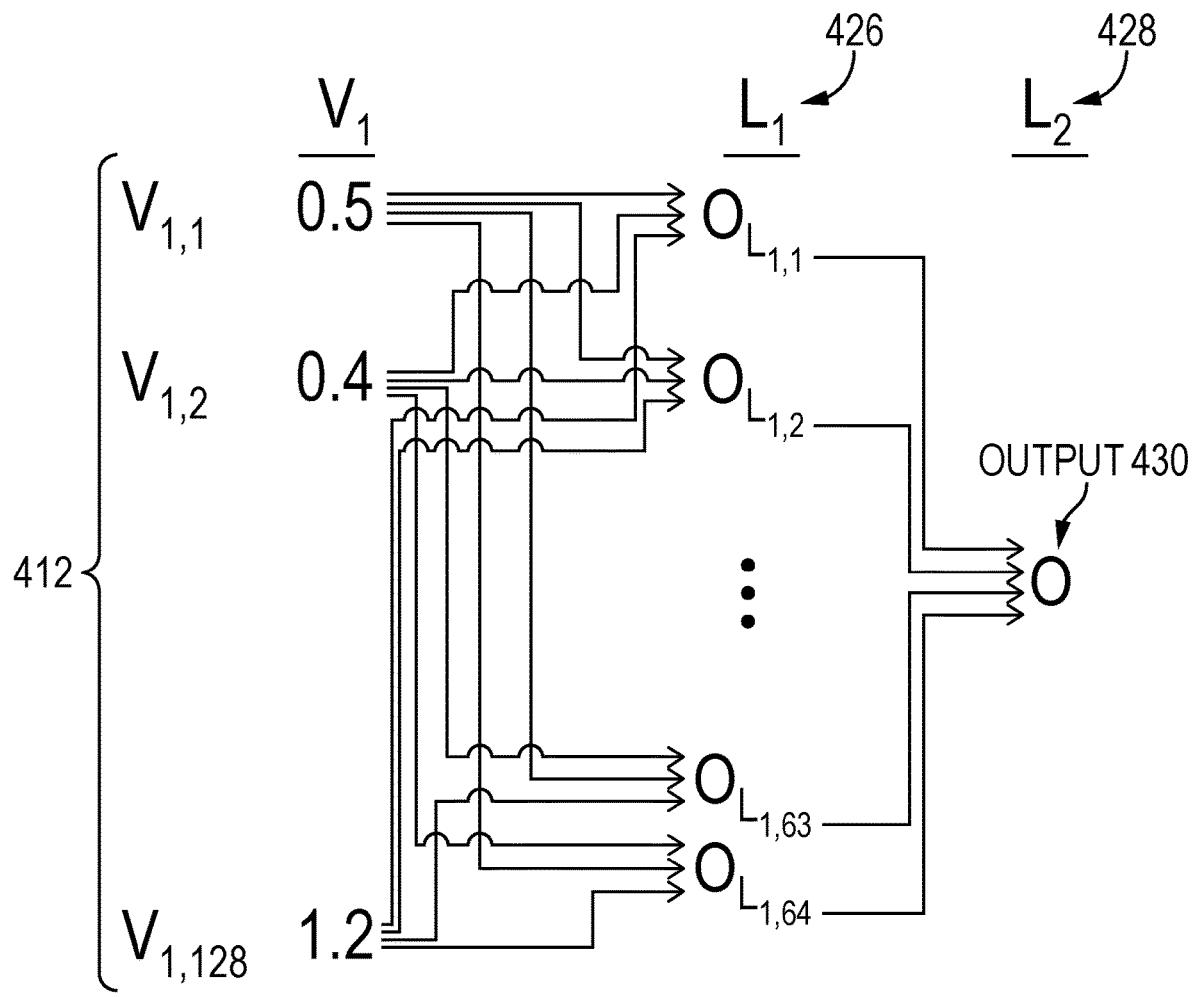

FIGS. 4A-4C illustrate the training of a first, machine learning model on a known application programming interface key to detect application programming interface key(s) according to embodiments of the disclosure. As one example, a known application programming interface key (e.g., token) is provided and is referred to herein as "EXAMPLEKEY". It should be understood that other characters may form a key, and this is used as an example. Other characters besides letters A-Z may be used in a key, for example, punctuation, integers 0-9, etc. In certain embodiments, "EXAMPLEKEY" is converted (e.g., mapped) from its sequence of constituent characters to a sequence of integers according to a dictionary. In one embodiment, the dictionary outputs a 0 for a request to pad (e.g., zero extend) a sequence, assigns a 1 for the letter A, a 2 for the letter B, a 3 for the letter C, a 4 for the letter D, a 5 for the letter E, . . . , and a 26 for the letter Z. For the key being the sequence of characters of "EXAMPLE KEY", the resulting integers form a vector $[c_1]$=[5, 24, 1, 13, 16, 12, 5, 5, 5, 25. 0 . . . 0] to form a vector of integers up to a desired maximum key length (e.g., 76 elements in one embodiment). In certain embodiments, a first machine learning model service (e.g., 104 in FIG. 1) performs this conversion, e.g., as preprocessing before embedding.

In certain embodiments, embedding is performed next. FIG. 4A illustrates the embedding 400 of integer sequence 402 (e.g., one dimensional vector) into an embedded matrix 404 (e.g., a two-dimensional matrix) according to embodiments of the disclosure. Embedded matrix 404 includes a row for each character of the may key length (e.g., 76 rows) and a plurality of weights in each column for a particular row. In certain embodiments, the number of columns (e.g., 24 columns) is the number of features of the first model as it is trained. In one embodiment, the weights are initially randomized.

In certain embodiments, a key vector is generated for the known application programming interface key. FIG. 4B illustrates a machine learning model (e.g., a recurrent neural network, such as, but not limited to, a long short-term memory type of model) being used to generate 406 a key vector $V_1$ 412 according to embodiments of the disclosure. In FIG. 4B, each block 408 of data represents a corresponding row of the embedded matrix 404 in FIG. 4A for a particular character of the known application programming interface key 410. For example, the first character of "EXAMPLE KEY" is the leading E, which corresponds to the first row of the embedded matrix 404 that includes the example weights 414 of [0.7, 0.8, . . . 0.9]. In certain embodiments, a first machine learning model service (e.g., 104 in FIG. 1) performs this second look-up, e.g., where the first look-up was the dictionary look-up discussed above.

In certain embodiments, the first row of weights from the embedded matrix 404 is input into cell 416 of the machine learning model. In one embodiment, each additional cell (e.g., cell 420, etc.) tracks the dependencies between the elements in the input sequence, for example, with cell 416 generating an output state (e.g., hidden state) 418 from the input weights 414 from the first row of the embedded matrix 404. In FIG. 4B, the output state 418 is input into cell 420 of the machine learning model along with an input 422 of the second row of the embedded matrix 404 for the corresponding character of X from the second element position of "EXAMPLE KEY" to generate an output state (e.g., hidden state) 424 from the input weights 422 from the second row of the embedded matrix 404 and the state 418 from the preceding cell 416. In the depicted embodiment, this continues for each element (and thus each cell of the machine learning model) until an output of the key vector 412 (e.g., of latent features) is produced.

In certain embodiments, the key vector is used with linear layers of a machine learning model to produce an output. FIG. 4C illustrates two linear layers 426, 428 of a machine learning model generating output 430 according to embodiments of the disclosure. In one embodiment, output 430 is a single number indicating a probability (e.g., between 0-1 or expressed as a corresponding percentage between 0%-100%) that the value (e.g., string) input into a model is an API key. Thus, for a known API key, a model utilizing the embodiments discussed in FIGS. 4A-4C may be trained to output 430 a high (e.g., greater than about 99%) probability for the known API key.

In FIG. 4C, each element of key vector 412 is input into first (e.g., dense) layer 426. In one embodiment, a layer is a fully connected layer such that all inputs feed (e.g., are broadcast) into every hidden unit (e.g., hidden unit $O_{L1,1}$, $O_{L1,2}$, . . . $O_{L1,X}$, where X is a positive integer (e.g., x=64)). In certain embodiments, each hidden unit outputs a single (e.g., floating-point) number, for example, such that the output of layer L1 426 is a (e.g., 64 element) vector where each element is a single number from a corresponding hidden unit. In certain embodiments, the output from layer L1 426 is input into a single hidden unit of layer L2 428 to generate a single number that corresponds to a probability (e.g., between 0-1 or expressed as a corresponding percentage between 0%-100%) that the value (e.g., string) input into a model is an API key.

This is repeated for other known API keys in certain embodiments until a desired performance of the model is achieved for various inputs. It should be understood the above can be applied to other private information.

In certain embodiments, a second model is trained on code that includes (e.g. known) API keys. In one embodiment, the context (e.g., the text immediately previous to the API keys) is provided as an input to a second, machine learning model. For example, if "EXAMPLEKEY" is found in code that includes SECRET_KEY="EXAMPLEKEY", where example key is a private (e.g., encrypted) string of characters and not the text of EXAMPLEKEY, this declaration of a constant (the text SECRET_KEY) may be considered a context for the following private PI key. In one embodiment, the first model may be used on the code with the (e.g., known) API keys to identify possible API keys to assist in training of the second model to detect a context of those identified, possible API keys.

FIGS. 5A-5D illustrate the training of a second, machine learning model on contexts adjacent to application programming interface keys to detect contexts adjacent to application programming interface key(s) in data according to embodiments of the disclosure. As one example, a known application programming interface key (e.g., token) is provided and is referred to herein as "EXAMPLEKEY" and the previous characters include the text string of SECRET_KEY. It should be understood that other characters may form a key and the above is used as an example. Other characters besides letters A-Z may be used in a key, for example, punctuation, integers 0-9, etc. In certain embodiments, this context of SECRET_KEY (e.g., corresponding to the API key of "EXAMPLEKEY") is converted (e.g., mapped) from its sequence of constituent characters to a sequence of integers according to a dictionary. In one embodiment, the dictionary outputs a 0 for a request to pad (e.g., zero extend) a sequence, assigns a 1 for the letter A, a 2 for the letter B, a 3 for the letter C, a 4 for the letter D, a 5 for the letter E, . . . , 26 for the letter Z, and/or a 27 for the underscore character of _. In one embodiment, the dictionary used for the first model is different than the dictionary used for the second model. For the context being the sequence of characters of "SECRET_KEY", the resulting integers form a vector $[c_1]=[19, 5, 3, 18, 5, 20, 27, 11, 5, 25 . . . ]$ to form a vector of integers up to a desired maximum context length (e.g., 40 elements in one embodiment). In certain embodiments, a second machine learning model service (e.g., 108 in FIG. 1) performs this conversion, e.g., as preprocessing before embedding.

Figure 5A:
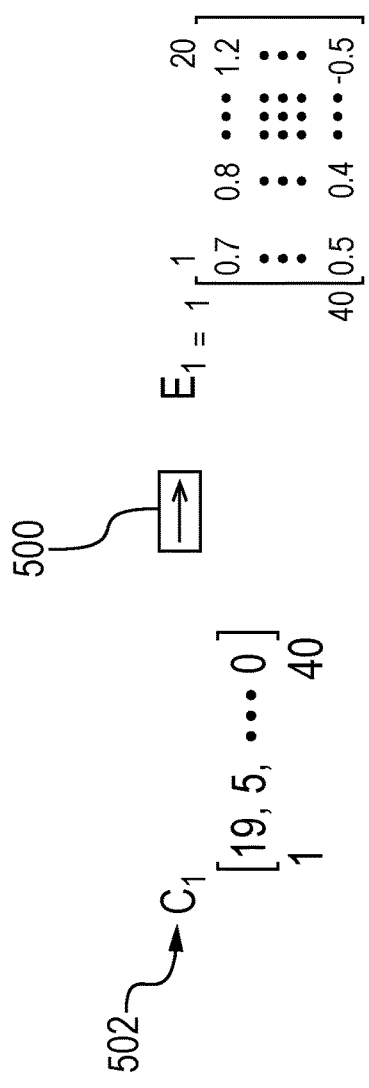
FIGS. 5A-5D illustrate the training of a second, machine learning model on contexts adjacent to application programming interface keys to detect contexts adjacent to application programming interface key(s) according to embodiments of the disclosure.

In certain embodiments, embedding is performed next. FIG. 5A illustrates the embedding 500 of integer sequence 502 (e.g., one dimensional vector) into an embedded matrix 504 (e.g., a two-dimensional matrix) according to embodiments of the disclosure. Embedded matrix 504 includes a row for each character of the may context length (e.g., 40 rows) and a plurality of weights in each column for a particular row. In certain embodiments, the number of columns (e.g., 20 columns) is the number of features of the second model as it is trained. In one embodiment, the weights are initially randomized.

Figure 5B:
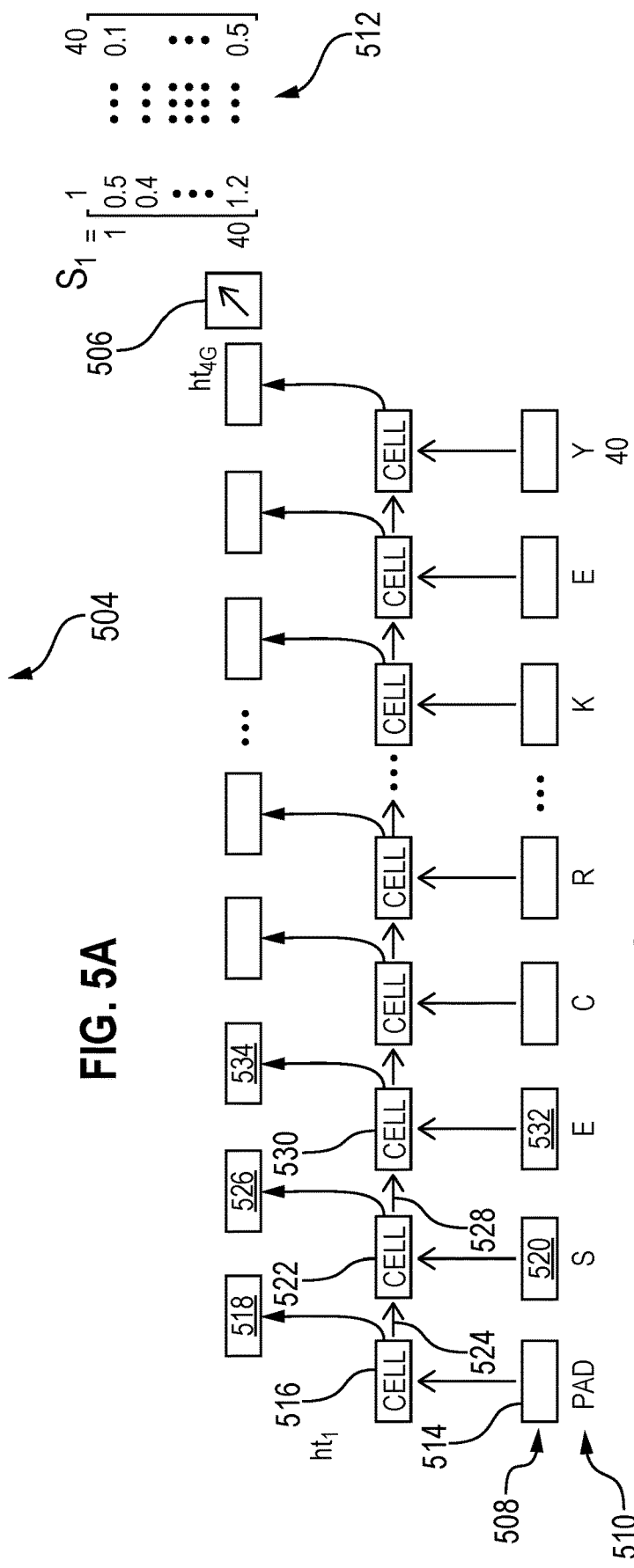

In certain embodiments, a hidden state matrix context vector is generated for the known application programming interface key. FIG. 5B illustrates a machine learning model (e.g., a recurrent neural network, such as, but not limited to, a long short-term memory type of model) being used to generate 506 a hidden state matrix $S_1$ 512 according to embodiments of the disclosure.

In certain embodiments, hidden state matrix is generated for a context of (or associated with) a known application programming interface key. FIG. 5B illustrates a machine learning model (e.g., a recurrent neural network, such as, but not limited to, a long short-term memory type of model) being used to generate hidden state matrix $S_1$ 512 according to embodiments of the disclosure. In FIG. 5B, each block 508 of data represents a corresponding row of the embedded matrix 504 in FIG. 5A for a particular character of the context 510 for the known application programming interface key, for example, other than the initial value or values of padded zeros that are input at the beginning of a context into respective cells to create a desired maximum context length (e.g., 40 elements in one embodiment), e.g., padded zeros 514 are input into initial cell 516 in FIG. 5B. For example, such that the total number of cells is equal to the desired maximum context length (e.g., 40 in one embodiment). As an example, the first character of context "SECRET_KEY" is the leading S, which corresponds to the first row of the embedded matrix 504 that includes the example weights of [0.7, 0.8, . . . 1.2]. In certain embodiments, a second machine learning model service (e.g., 108 in FIG. 1) performs this second look-up, e.g., where the first look-up was the dictionary look-up discussed above.

In certain embodiments, padded zeros (e.g., a string of padded zeros) are input as weights into cell 516 of the machine learning model to form output state (e.g., hidden state) 518. In one embodiment, each additional cell (e.g., cell 522, etc.) tracks the dependencies between the elements in the input sequence, for example, with cell 516 generating an output state (e.g., hidden state) 518 from the input weights from the padded zero 514 input into cell and generating an internal state 524 that is passed along to the next cell 522. As depicted, next cell 522 generates an output state (e.g., hidden state) 526 from the input weights 520 from the first row of the embedded matrix 504 and the internal state 524 from cell 516. In FIG. 5B, the internal state 528 is input into cell 530 of the machine learning model along with an input 532 of the second row of the embedded matrix 504 for the corresponding character of E from the second element position of SECRET_KEY to generate an output state (e.g., hidden state) 534 from the input weights 532 from the second row of the embedded matrix 404 and the internal state 528 from the preceding cell 522. In the depicted embodiment, this continues for each element (and thus each cell of the machine learning model) until an output of the hidden state matrix $S_1$ 512 is produced. In one embodiment, the first column of hidden state matrix $S_1$ 512 is the hidden state vector 518 produced by cell 516, the second column of hidden state matrix $S_1$ 512 is the hidden state vector 526 produced by cell 522, the third column of hidden state matrix $S_1$ 512 is the hidden state vector 534 produced by cell 530, etc.

Figure 5C:
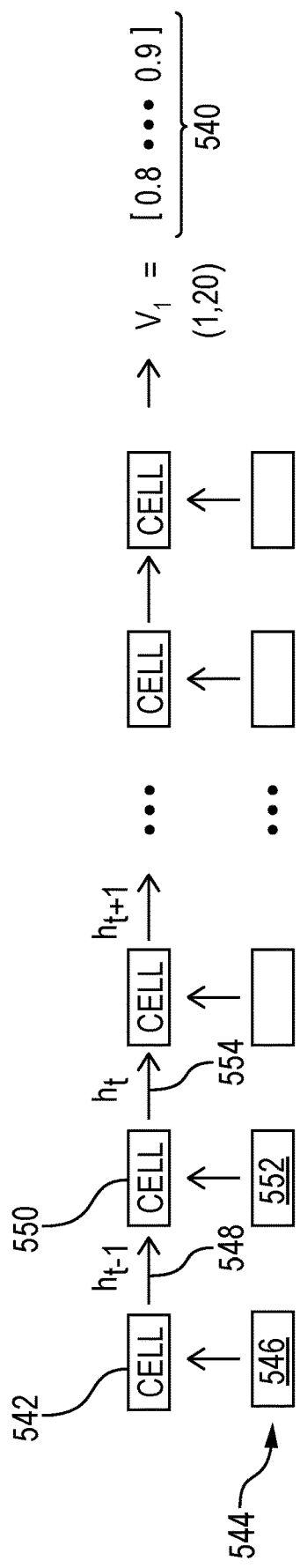

FIG. 5C illustrates a machine learning model (e.g., a recurrent neural network, such as, but not limited to, a long short-term memory type of model) being used to generate a context vector $V_1$ 540 according to embodiments of the disclosure. In FIG. 5C, each block 544 of data represents a corresponding row of the hidden state matrix $S_1$ 512 in FIG. 5B. In certain embodiments, a second machine learning model service (e.g., 108 in FIG. 1) performs this third look-up, e.g., along with the first look-up and the second look-up discussed above.

In certain embodiments, the first row of weights from the hidden state matrix $S_1$ 512 is input into cell 542 of the machine learning model. In one embodiment, each additional cell (e.g., cell 550, etc.) tracks the dependencies between the elements in the input sequence, for example, with cell 542 generating an output state (e.g., hidden state) 548 from the input weights 546 from the first row of the hidden state matrix $S_1$ 512. In FIG. 5C, the output state 548 is input into cell 550 of the machine learning model along with an input 552 of the second row of the hidden state matrix $S_1$ 512 to generate an output state (e.g., hidden state) 554 from the input weights 552 from the second row of the hidden state matrix $S_1$ 512 and the state 548 from the preceding cell 542. In the depicted embodiment, this continues for each element (and thus each cell of the machine learning model) until an output of the context vector 540 is produced.

Figure 5D:
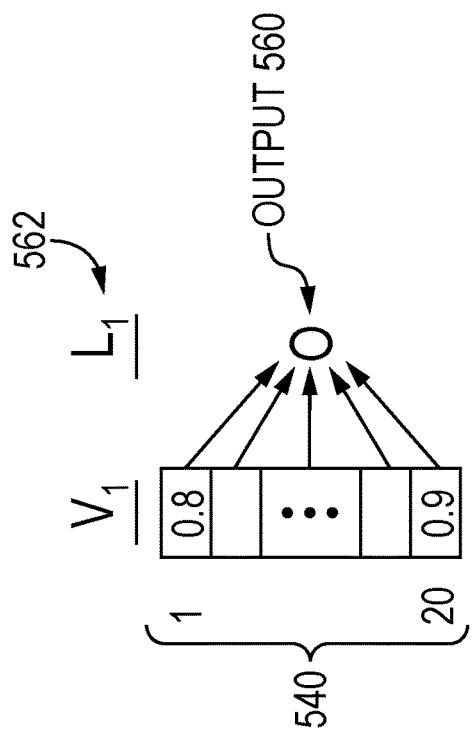

In certain embodiments, the context vector is used with a linear layer of a machine learning model to produce an output. FIG. 5D illustrates a single linear layer 562 of a machine learning model generating output 560 according to embodiments of the disclosure. In one embodiment, output 560 is a single number indicating a probability (e.g., between 0-1 or expressed as a corresponding percentage between 0%-100%) that the value (e.g., string) input into a model is a context of an API key. Thus, for a known context of an API key, a model utilizing the embodiments discussed in FIGS. 5A-5D may be trained to output 560 a high (e.g., greater than about 99%) probability for the known API key.

In FIG. 5D, each element of context vector 540 is input into first (e.g., dense) layer 562. In one embodiment, a layer is a fully connected layer such that all inputs feed (e.g., are broadcast) into single hidden unit (e.g., hidden unit $O_{L1}$). In certain embodiments, the output of context vector $V_1$ 540 is input into a single hidden unit of layer L1 562 to generate a single number that corresponds to a probability (e.g., between 0-1 or expressed as a corresponding percentage between 0%-100%) that the value (e.g., string) input into a model is (e.g., or likely is) a context corresponding to an API key.

This is repeated for other known contexts of known API keys in certain embodiments until a desired performance of the model is achieved for various inputs. It should be understood the above can be applied to contexts for other private information. Although certain example numbers are utilized herein, it should be understood these are examples and other numbers may be utilized. The index numbers for respective elements (e.g., indices 1-76 for the rows of embedded matrix 404 in FIG. 4A and indices 1-24 for the columns of embedded matrix 404 in FIG. 4A) are also examples and other numbers may be utilized.

FIG. 6 illustrates a flow diagram 600 according to embodiments of the disclosure. Depicted flow 600 includes training a first, machine learning model on a set of known application programming interface keys to detect application programming interface keys 602; training a second, machine learning model on code including known application programming interface keys to detect adjacent characters to application programming interface keys 604; scanning a repository with the first, machine learning model to select a proper subset of the repository that includes possible application programming interface keys and adjacent characters 606; scanning the proper subset of the repository with the second, machine learning model to detect and remove potential false positives of the possible application programming interface keys based on adjacent characters of the possible application programming interface keys to generate a list of probable application programming interface keys 608; and sending an indication for the list of probable application programming interface keys 610.

In certain embodiments, a detector of a data loss prevention service utilizes one or both of the models discussed herein to detect (e.g., probable) private information (e.g., probable API keys). In certain embodiments, a data loss prevention service trains one or both of the models discussed herein, e.g., before utilizing them.

In certain embodiments, a first (API key detection) model is run on a repository (e.g., code stored therein) to detect possible application programming interface keys, and then the second (API key context detection) model is run on the repository (e.g., only on the adjacent characters (e.g., a predetermined number of characters) for the set of possible application programming interface keys returned by the first model). In one embodiment, the second model is used to mark (e.g., and then remove) likely false positives from the set of possible application programming interface keys returned by the first model to generate a set of probable application programming interface keys. In one embodiment, the set of probable application programming interface keys may then be utilized by the detector as results (e.g., results 112 in FIG. 1). The results may cause a corrective action to be taken, for example, one or any combination of: deleting probable application programming interface key(s), quarantining probable application programming interface key(s), deleting probable application programming interface key(s), redacting probable application programming interface key(s), or changing access permission for storage that is storing the probable application programming interface key(s).

In one embodiment, the scanning by the first model and/or the second model is in response to receipt of a uniform resource locator (URL) value and a corresponding key for a repository that is to be scanned. In one embodiment, the trained, first model detects at least one application programming interface key that is not one of the set of known application programming interface keys. Additionally or alternatively, in certain embodiments, the trained, second model detects at least one context of an application programming interface key that is not one of a set of known contexts for known application programming interface key(s).

The input into a detector to cause training of the first model and/or the second model is receipt of a training command and training data (e.g., training data 116 in FIG. 1) in one embodiment. The input into a detector to cause scanning with the first model and/or the second model is receipt of a scanning command and an indication of the data to be scanned in one embodiment. The results of the scans may be a list that indicates probable application programming interface key(s). The generation of probable application programming interface key(s) may cause an indication to be sent (e.g., to a user). The indication may include a link to each of the probable application programming interface keys within the scanned repository. The indication may be generated so as to not include a probable application programming interface key itself of the probable application programming interface keys (e.g., for security reasons). The indication may a proper subset of characters of each of the probable application programming interface keys (e.g., as shown in FIG. 3). In certain embodiments, the scanning with the first, machine learning model and the scanning with the second, machine learning model does not retain a copy of the repository (e.g., after the scans are completed).

In certain embodiments, the results of the scan (e.g., status, number of results, etc.) are presented as shown in FIG. 2 and/or FIG. 3. In one embodiment, the results are the probable application programming interface key or keys detected within a repository by a scan with the first machine learning model and the second machine learning model discussed herein.

For example, the scan results depicted in FIG. 3 indicate two possible instances of private information (e.g., an API key beginning with "db" for entry number 1 and an API key beginning with "sk" for entry number 2 of two total number of results) returned for the repository scanned at the "example URL" location.

Figure 7:
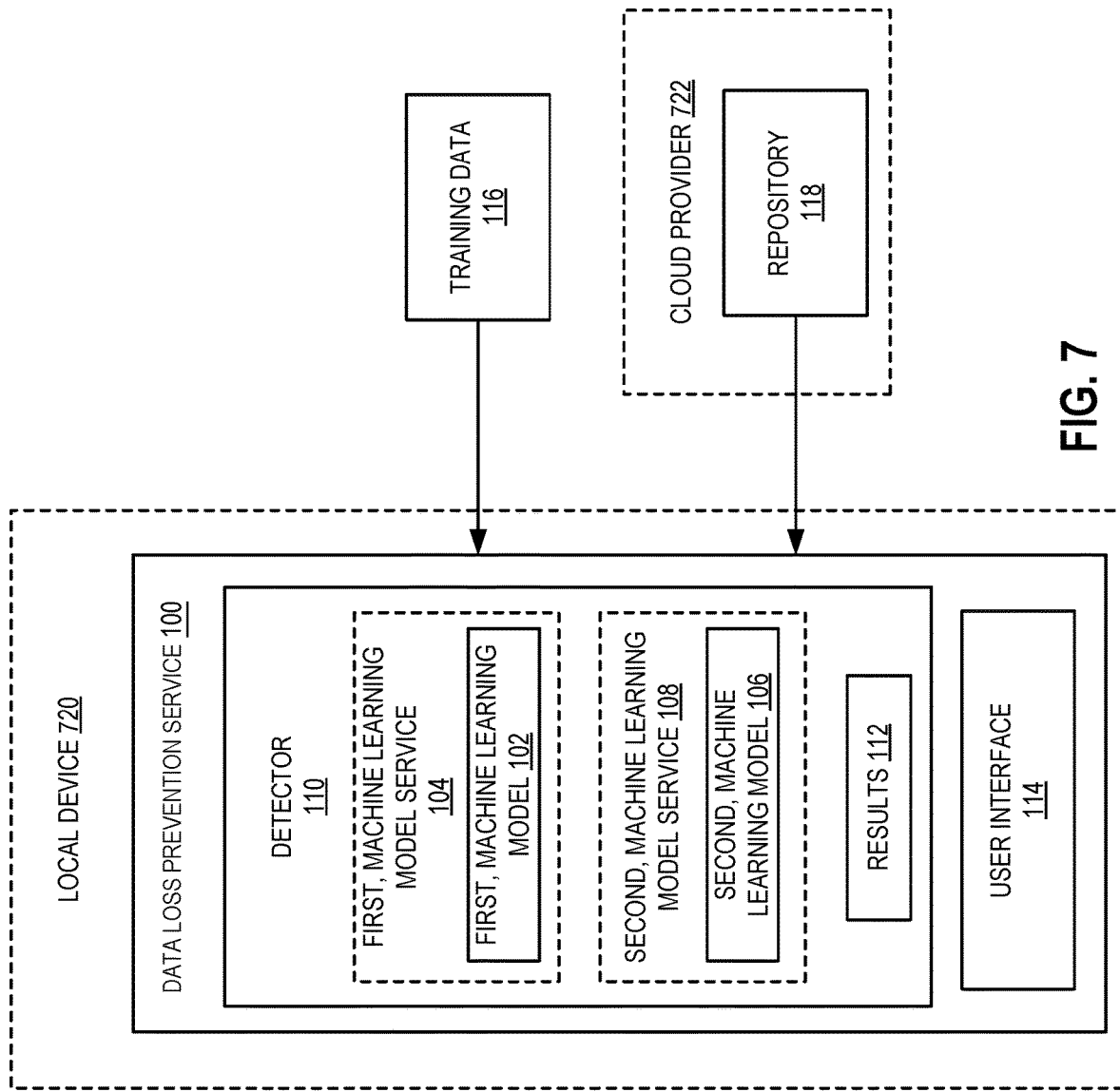
FIG. 7 is a diagram illustrating an environment including a data loss prevention service having a detector in a local device to detect private information in a repository in a cloud provider according to embodiments of the disclosure.

FIG. 1 depicts an embodiment where detector 110 is within a first cloud provider 120. Figures FIG. 7 is a diagram illustrating an environment including a data loss prevention service 100 having a detector 110 in a local device 720 to detect private information in a repository 118 in a cloud provider 722 according to embodiments of the disclosure. Local device 720 is a user's (e.g., local) device in certain embodiments.

Figure 8:
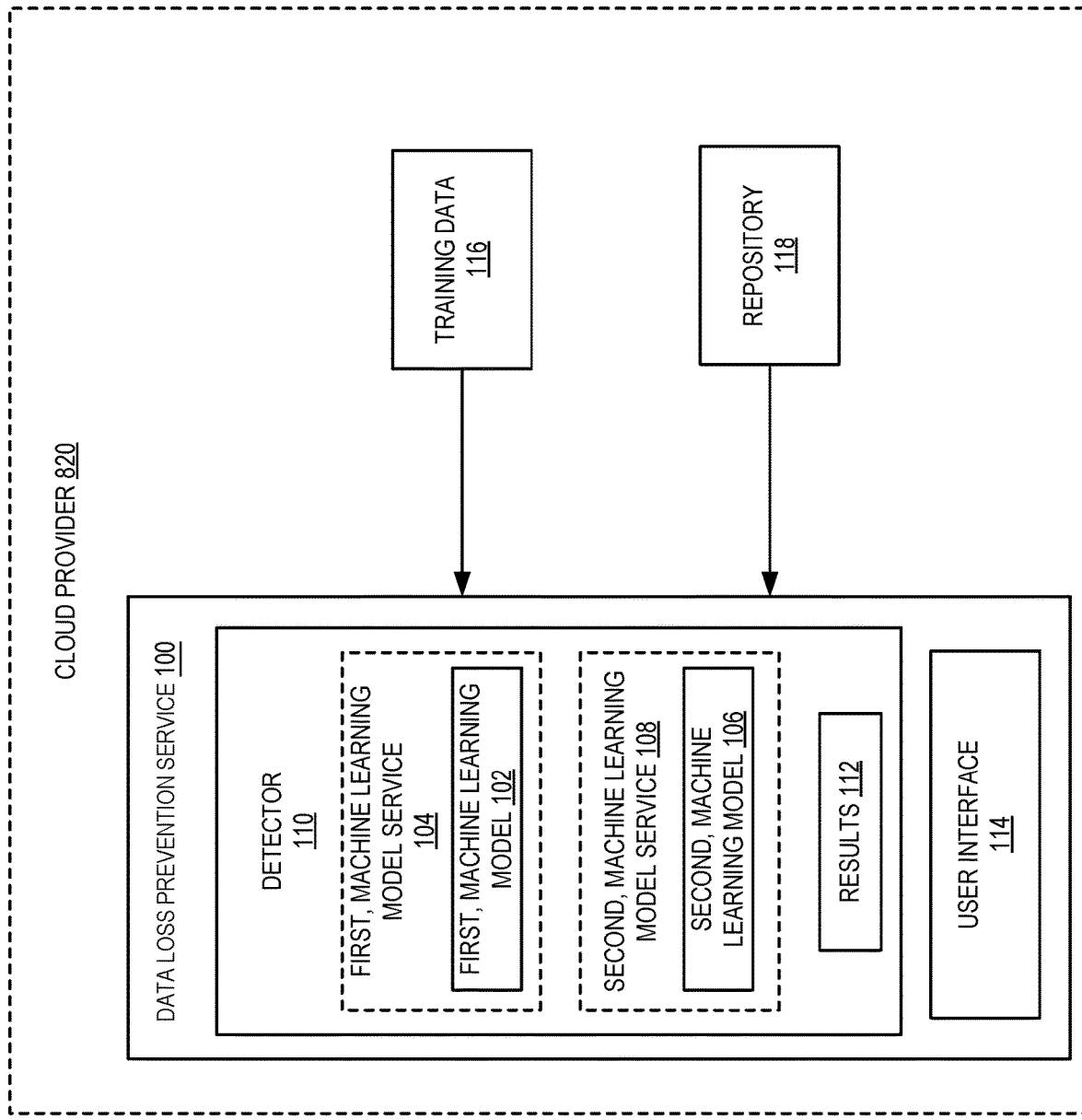
FIG. 8 is a diagram illustrating an environment in a cloud provider including a data loss prevention service having a detector to detect private information in a repository according to embodiments of the disclosure.

FIG. 8 is a diagram illustrating an environment in a cloud provider 820 including a data loss prevention service 100 having a detector 110 to detect private information in a repository 118 according to embodiments of the disclosure. In FIG. 8, the data loss prevention service 100, training data 116, and repository 118 are depicted as being within cloud provider 820. In another embodiment, the training data 116 and/or repository 118 may be separate from cloud provider 820.

Figure 9:
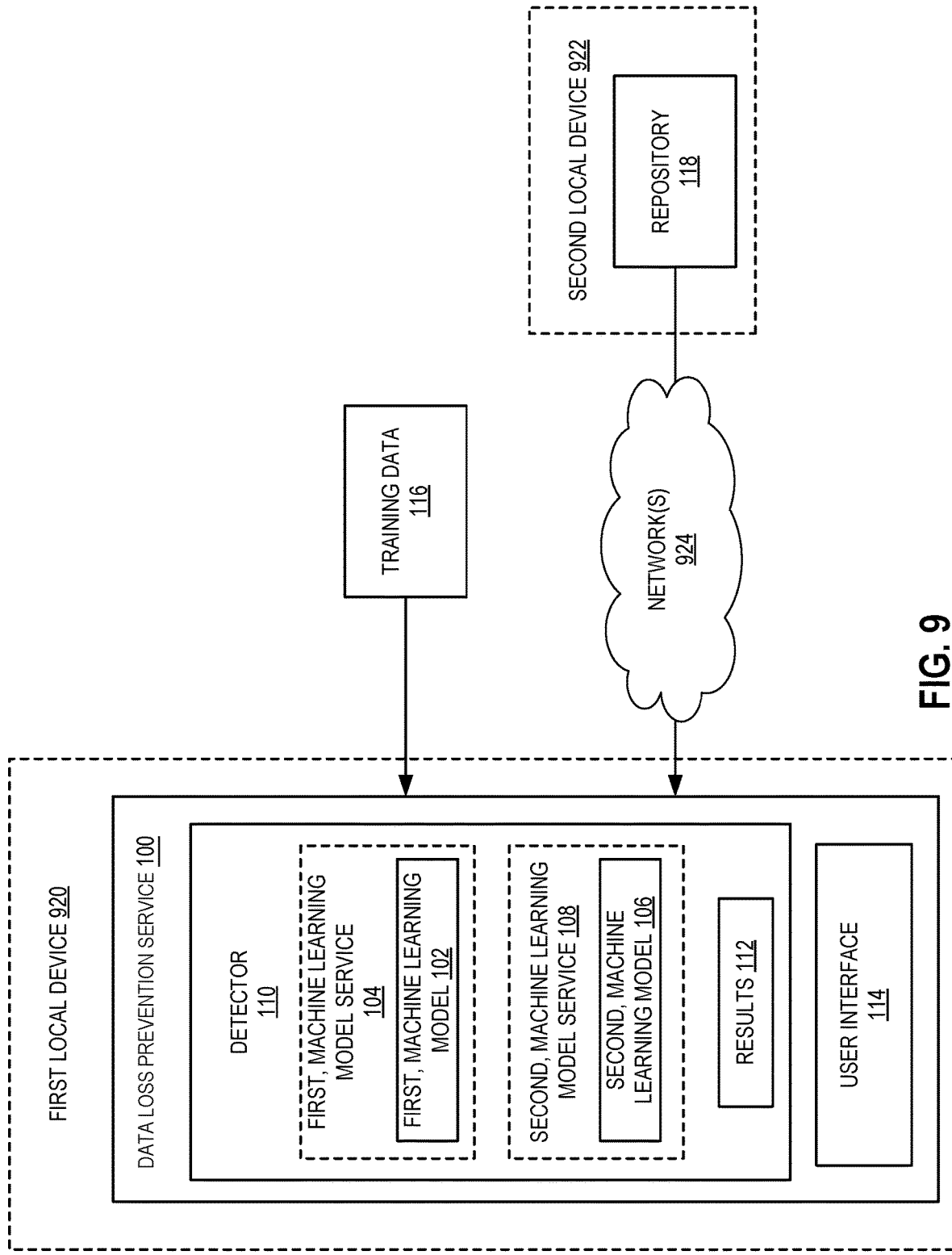
FIG. 9 is a diagram illustrating an environment including a data loss prevention service having a detector in a first local device to detect private information in a repository from a second local device according to embodiments of the disclosure.

FIG. 9 is a diagram illustrating an environment including a data loss prevention service 100 having a detector 110 in a first local device 920 to detect private information in a repository 118 from a second local device 922 according to embodiments of the disclosure. In one embodiment, each local device is an instance of a device in FIG. 11. In one embodiment, network(s) 924 are used to communicate between first local device 920 and second local device 922, e.g., to allow access to repository 118 (or send a copy of data from repository 118) by first local device 920.

Figure 10:
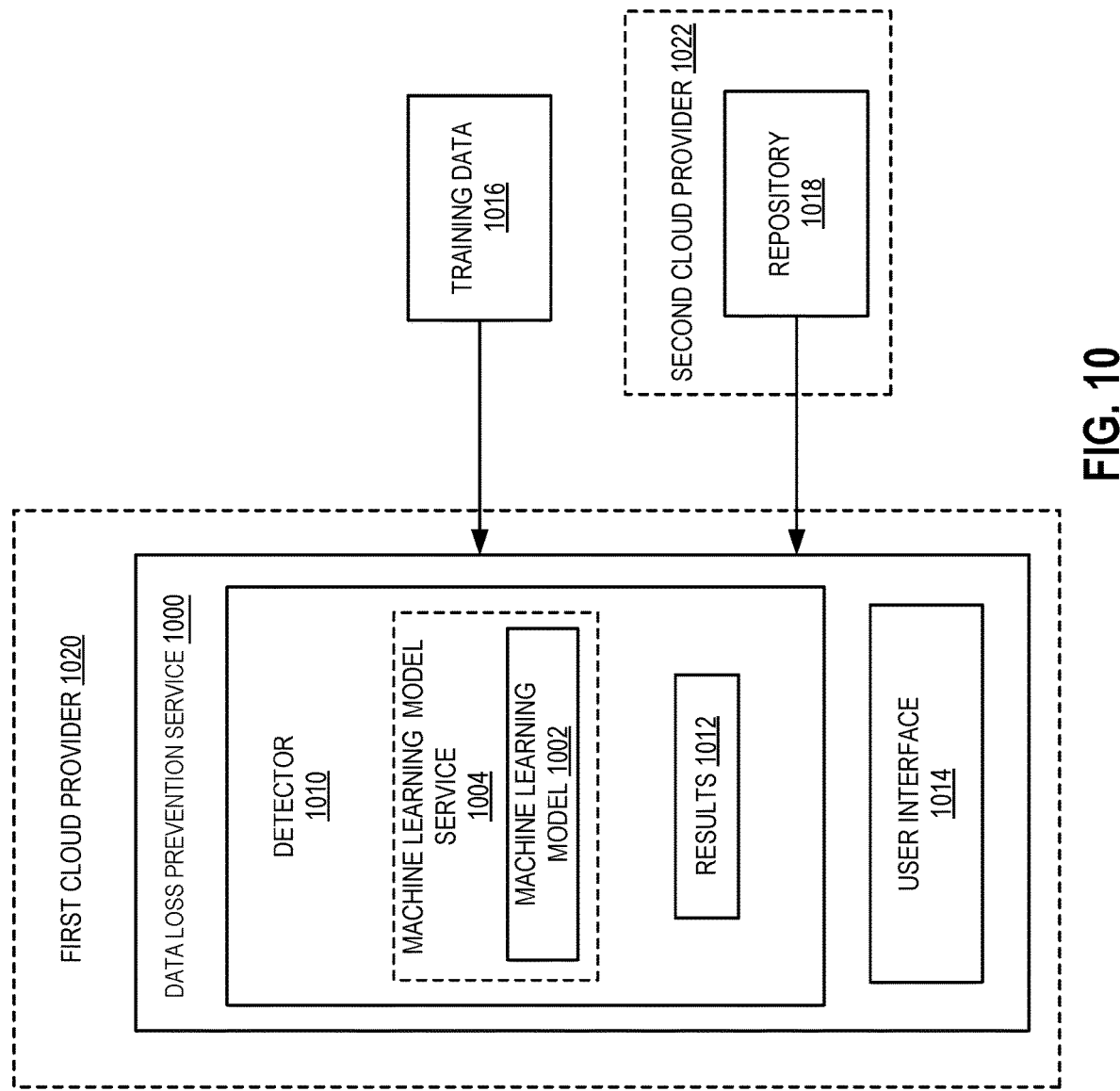
FIG. 10 is a diagram illustrating an environment including a data loss prevention service having a detector in a first cloud provider to detect private information in a repository in a second cloud provider according to embodiments of the disclosure.

FIG. 10 is a diagram illustrating an environment including a data loss prevention service 1000 having a detector 1010 in a first cloud provider 1020 to detect private information in a repository 1018 in a second cloud provider 1022 according to embodiments of the disclosure. Detector 1010 includes a single machine learning model 1002. In one embodiment, In certain embodiments, a machine learning model is trained on a set of known private information (e.g., application programming interface keys) and its context information to detect private information (e.g., application programming interface keys). In certain embodiments, the machine learning model 1002 is run on code (e.g., training data 1016) to retrieve a proper subset of the code as possible private information (e.g., possible application programming interface keys) and trained on the code (e.g., training data 1016) by marking the proper subset of the code to indicate false positives (e.g., and true positives) of the possible private information (e.g., possible application programming interface keys). In one embodiment, the trained, machine learning model 1002 is used to scan repository 1018 to detect a potential occurrence(s) of private information (e.g., an application programming interface key(s)) to generate results 1012. In one embodiment, detector 1010 generates (e.g., sends) an indication for the potential occurrence(s) of private information (e.g., an application programming interface key(s)). Depicted data loss prevention service 1000 includes a user interface 1014 to allow a user to configure the data loss prevention service (e.g., the detector 1010 thereof). In one embodiment, user interface is a dashboard that allows viewing of results visually, e.g., rather than programatically.

In certain embodiments, data loss prevention service 1000 includes machine learning model service 1004 to generate and/or train machine learning model 1002.

Optionally, detector 1010 is stored and executed on first cloud provider 1020. Optionally, repository 1018 is stored on second cloud provider 1022. In one embodiment, a cloud provider is a network that provides a storage service and a hardware virtualization service to user (e.g., customers).

Detector 1010 scans repositories for private information (e.g., sensitive credentials & secrets, such as, but not limited to, API keys). In one embodiment, 1010 detector utilize model 1002 built via machine learning. In certain embodiments, there is no need to specify what exact types of private information (e.g., keys or credentials) that are being searched for as the detector 1010 discovers a very broad set of private information. A further discussion of training of machine learning models is herein, e.g., in reference to FIGS. 4A-5D.

As one example, trained detector 1010 is set (e.g., via user interface 1014) to scan repository 1018 for confidential information. In one embodiment, repository 1018 is public. In another embodiment, repository 1018 is private and access to it is provided, e.g., via a user provided key or via a repository account that is logged into data loss prevention service 1000 with. In certain embodiments, the full commit history of repository 1018 will be scanned. In certain embodiments, only the files in the current working directory of repository 1018 will be scanned.

In one embodiment, detector 1010 runs scans asynchronously such that the endpoint will respond immediately upon starting the scan with a scan identification (ID) value. The scan ID may be used to retrieve the results (e.g., indication of probable private information) when ready via an API call, e.g., "Get Scan Results". User interface 1014 may provide a notification (e.g., via email or at a webhook endpoint as discussed above) when the scan is complete and results are ready for retrieval.

In certain embodiments, the machine learning model 1002 is run on code (e.g., training data 1016) to select a proper subset of the code as possible private information (e.g., possible application programming interface keys), and trained by marking false positives (e.g., and true positives) false (e.g., or true, accordingly) for those possible API keys.

In certain embodiments, the machine learning model 1002 is run on code (e.g., training data 1016) to select a proper subset of the code as a context of (e.g., context immediately preceding) possible private information (e.g., possible application programming interface keys), and trained by marking false positives (e.g., and true positives) false (e.g., or true, accordingly) for those possible contexts.

In certain embodiments, the trained machine learning model 1002 is used by detector 1010 to scan repository 1018 to detect (e.g., probable) occurrence(s) of private information (e.g., an application programming interface key(s)) to generate results 1012. In one embodiment, the detector 1010 scans repository 1018 with an "API key detection" machine learning model 1002 to select a proper subset of the repository 1018 that includes possible application programming interface keys to generate a list of probable application programming interface key(s) (e.g., as results 112). In another embodiment, the detector 1010 scans repository 1018 with an "API key context detection" machine learning model 1002 to select a proper subset of the repository 1018 that includes possible application programming interface keys from their context to generate a list of probable application programming interface key(s) (e.g., as results 1012). In one embodiment, detector 110 sends an indication (e.g., as results 1012) for the list of probable application programming interface key(s).

An exemplary computing device that the above may be used in is detailed below.

Figure 11:
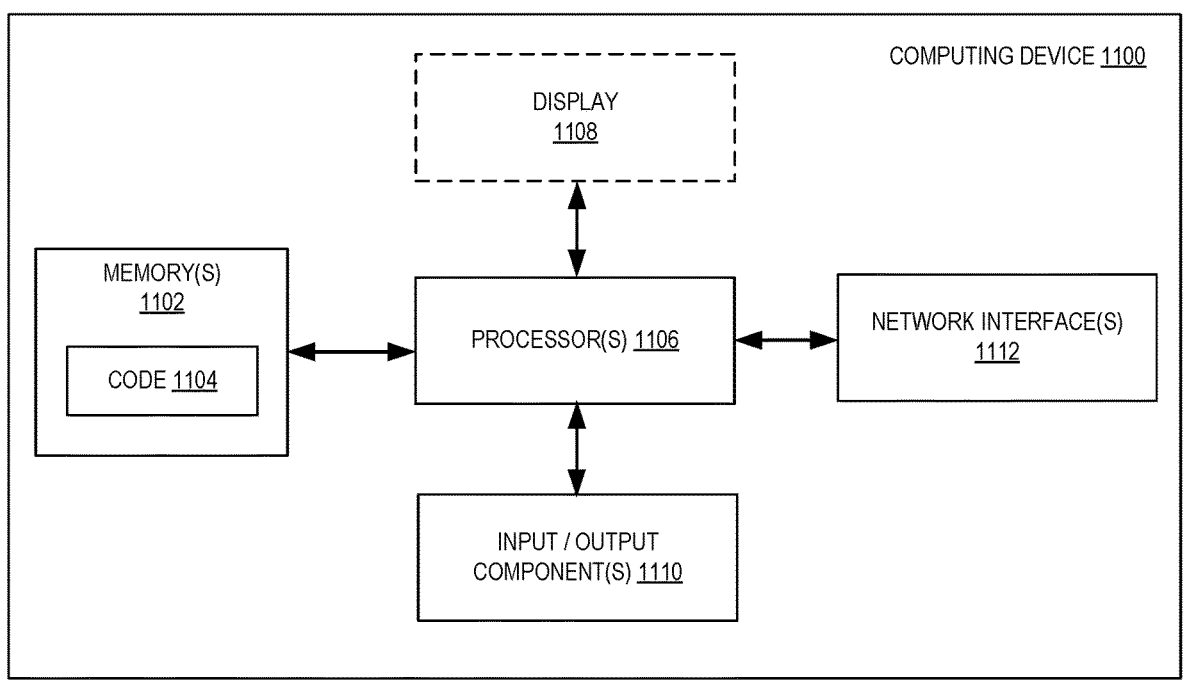
FIG. 11 illustrates an example computing device according to embodiments of the disclosure.

FIG. 11 illustrates a computing device 1100 according to embodiments of the disclosure. Computing device 1100 includes: one or more processors 1106, one or more memories 1102 (e.g., system memory and/or cache memory), an optional display 1108 (e.g., to display dashboard 200 in FIG. 2 and/or results summary 300 in FIG. 3), one or more input/output (I/O) components 1110, and one or more network interfaces 1112.

One or more processors 1106 execute instructions (e.g., from code 1104) to perform software routine(s) that the computing device implements. I/O components 1110 may include keyboard and pointing device (e.g., mouse), and/or device port(s). Network interfaces 1112 may include a wired or wireless connection to a network. In one embodiment, computing device implements a virtual machine instance (e.g., and a service is executed on the virtual machine instance).

At least some embodiments of the disclosed technologies can be described in view of the following examples:

Example 1. A method comprising:
  training a first, machine learning model on a set of known application programming interface keys to detect application programming interface keys;
  training a second, machine learning model on code including known application programming interface keys to detect adjacent characters to application programming interface keys;
  scanning a repository with the first, machine learning model to select a proper subset of the repository that includes possible application programming interface keys and adjacent characters;
  scanning the proper subset of the repository with the second, machine learning model to detect and remove potential false positives of the possible application programming interface keys based on adjacent characters of the possible application programming interface keys to generate a list of probable application programming interface keys; and
  sending an indication for the list of probable application programming interface keys.

Example 2. The method of example 1, wherein the scanning with the first, machine learning model is in response to receipt of a uniform resource locator value and a corresponding key for the repository.

Example 3. The method of example 1, wherein the possible application programming interface keys includes at least one application programming interface key that is not one of the set of known application programming interface keys.

Example 4. The method of example 1, wherein the indication comprises a link to each of the probable application programming interface keys within the repository.

Example 5. The method of example 1, wherein the indication does not include a probable application programming interface key itself of the probable application programming interface keys.

Example 6. The method of example 1, wherein the indication includes a proper subset of characters of each of the probable application programming interface keys.

Example 7. The method of example 1, wherein the scanning with the first, machine learning model and the scanning with the second, machine learning model does not retain a copy of the repository.

Example 8. A method comprising:
  training a first, machine learning model on a set of known private information to detect private information;
  training a second, machine learning model on code including known private information to detect adjacent characters to known private information;
  scanning a repository with the first, machine learning model to select a proper subset of the repository that includes possible private information and adjacent characters;
  scanning the proper subset of the repository with the second, machine learning model to detect and remove potential false positives of the possible private information based on adjacent characters of the possible private information to generate a list of probable private information; and sending an indication for the list of probable private information.

Example 9. The method of example 8, wherein the scanning with the first, machine learning model is in response to receipt of a uniform resource locator value and a corresponding key for the repository.

Example 10. The method of example 8, wherein the possible private information is not one of the set of known private information.

Example 11. The method of example 8, wherein the indication comprises a link to the probable private information within the repository.

Example 12. The method of example 8, wherein the indication does not include the probable private information itself.

Example 13. The method of example 8, wherein the indication only includes a proper subset of characters of the probable private information.

Example 14. The method of example 8, wherein the scanning with the first, machine learning model and the scanning with the second, machine learning model does not retain a copy of the repository.

Example 15. A non-transitory machine readable medium that stores program code that when executed by a machine causes the machine to perform a method comprising:

training a first, machine learning model on a set of known private information to detect private information;

training a second, machine learning model on code including known private information to detect adjacent characters to known private information;

scanning a repository with the first, machine learning model to select a proper subset of the repository that includes possible private information and adjacent characters;

scanning the proper subset of the repository with the second, machine learning model to detect and remove potential false positives of the possible private information based on adjacent characters of the possible private information to generate a list of probable private information; and sending an indication for the list of probable private information.

Example 16. The non-transitory machine readable medium of example 15, wherein the scanning with the first, machine learning model is in response to receipt of a uniform resource locator value and a corresponding key for the repository.

Example 17. The non-transitory machine readable medium of example 15, wherein the possible private information is not one of the set of known private information.

Example 18. The non-transitory machine readable medium of example 15, wherein the indication comprises a link to the probable private information within the repository.

Example 19. The non-transitory machine readable medium of example 15, wherein the indication does not include the probable private information itself.

Example 20. The non-transitory machine readable medium of example 15, wherein the indication only includes a proper subset of characters of the probable private information.

In yet another embodiment, an apparatus comprises a data storage device that stores code that when executed by a hardware processor causes the hardware processor to perform any method disclosed herein. An apparatus may be as described in the detailed description. A method may be as described in the detailed description.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium. Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

What is claimed is:

1. A method comprising:
   training a first machine learning model on a first set of known application programming interface keys to detect application programming interface keys;
   training a second machine learning model on code including a second set of known application programming interface keys to detect adjacent characters to application programming interface keys;
   scanning a repository with the first machine learning model to select a subset of the repository that includes possible application programming interface keys and adjacent characters;
   scanning the subset of the repository with the second machine learning model to detect and remove potential false positives of the possible application programming interface keys, based on generating an inference by the second machine learning model for adjacent characters of the possible application programming interface keys, to generate a list of probable application programming interface keys, wherein the generating the inference by the second machine learning model comprises:
  converting a set of the adjacent characters of the subset of the repository according to a dictionary into a vector of numbers,
  embedding the vector of numbers into an embedded matrix comprising a row for each character of the set of the adjacent characters and a plurality of weights in each column for a particular row,
  generating a state matrix from the embedded matrix,
  generating a context vector from the state matrix, and
  generating an output from the context vector, and
  sending an indication for the list of probable application programming interface keys.

2. The method of claim 1, wherein the scanning with the first machine learning model is in response to receipt of a uniform resource locator value and a corresponding key for the repository.

3. The method of claim 1, wherein the possible application programming interface keys includes at least one application programming interface key that is not one of the first set of known application programming interface keys or the second set of known application programming interface keys.

4. The method of claim 1, wherein the indication comprises a link to each of the probable application programming interface keys within the repository.

5. The method of claim 1, wherein the indication does not include a probable application programming interface key itself of the probable application programming interface keys.

6. The method of claim 1, wherein the indication includes a subset of characters of each of the probable application programming interface keys.

7. The method of claim 1, wherein the scanning with the first machine learning model and the scanning with the second machine learning model does not retain a copy of the repository.

8. A method comprising:
  training a first machine learning model on a first set of known private information to detect private information;
  training a second machine learning model on code including a second set of known private information to detect adjacent characters to known private information;
  scanning a repository with the first machine learning model to select a subset of the repository that includes possible private information and adjacent characters;
  scanning the subset of the repository with the second machine learning model to detect and remove potential false positives of the possible private information, based on generating an inference by the second machine learning model for adjacent characters of the possible private information, to generate a list of probable private information, wherein the generating the inference by the second machine learning model comprises:
    converting a set of the adjacent characters of the subset of the repository according to a dictionary into a vector of numbers,
    embedding the vector of numbers into an embedded matrix comprising a row for each character of the set of the adjacent characters and a plurality of weights in each column for a particular row,
    generating a state matrix from the embedded matrix,
    generating a context vector from the state matrix, and
    generating an output from the context vector, and
  sending an indication for the list of probable private information.

9. The method of claim 8, wherein the scanning with the first machine learning model is in response to receipt of a uniform resource locator value and a corresponding key for the repository.

10. The method of claim 8, wherein the possible private information is not one of the first set of known private information or the second set of known private information.

11. The method of claim 8, wherein the indication comprises a link to the probable private information within the repository.

12. The method of claim 8, wherein the indication does not include the probable private information itself.

13. The method of claim 8, wherein the indication only includes a subset of characters of the probable private information.

14. The method of claim 8, wherein the scanning with the first machine learning model and the scanning with the second machine learning model does not retain a copy of the repository.

15. A non-transitory machine readable medium that stores program code that when executed by a machine causes the machine to perform a method comprising:
  training a first machine learning model on a first set of known private information to detect private information;
  training a second machine learning model on code including a second set of known private information to detect adjacent characters to known private information;
  scanning a repository with the first machine learning model to select a subset of the repository that includes possible private information and adjacent characters;
  scanning the subset of the repository with the second machine learning model to detect and remove potential false positives of the possible private information, based on generating an inference by the second machine learning model for adjacent characters of the possible private information, to generate a list of probable private information, wherein the generating the inference by the second machine learning model comprises:
    converting a set of the adjacent characters of the subset of the repository according to a dictionary into a vector of numbers,
    embedding the vector of numbers into an embedded matrix comprising a row for each character of the set of the adjacent characters and a plurality of weights in each column for a particular row,
    generating a state matrix from the embedded matrix,
    generating a context vector from the state matrix, and
    generating an output from the context vector, and
  sending an indication for the list of probable private information.

16. The non-transitory machine readable medium of claim 15, wherein the scanning with the first machine learning model is in response to receipt of a uniform resource locator value and a corresponding key for the repository.

17. The non-transitory machine readable medium of claim 15, wherein the possible private information is not one of the first set of known private information or the second set of known private information.

18. The non-transitory machine readable medium of claim 15, wherein the indication comprises a link to the probable private information within the repository.

19. The non-transitory machine readable medium of claim 15, wherein the indication does not include the probable private information itself.

20. The non-transitory machine readable medium of claim 15, wherein the indication only includes a subset of characters of the probable private information.

* * * * *